United States Patent Office 3,156,732
Patented Nov. 10, 1964

3,156,732
TELOMERS FROM TETRAFLUOROETHYLENE
AND SECONDARY IODIDES
Murray Hauptschein, Glenside, and Milton Braid, Philadelphia, Pa., assignors to Pennsalt Chemicals Corporation, Philadelphia, Pa., a corporation of Pennsylvania
No Drawing. Filed Jan. 16, 1961, Ser. No. 82,701
11 Claims. (Cl. 260—653.1)

This invention relates to the telomerization of tetrafluoroethylene.

This application is a continuation-in-part of copending application Serial No. 735,702, filed May 16, 1958 of Murray Hauptschein et al.

A variety of telomers of tetrafluoroethylene are known. They may all be described as relatively low molecular weight open chain compounds of the general formula $A(CF_2CF_2)_nB$ where A and B are end groups derived from a telogen AB and where $n$ is an integer ranging usually from 1 to about 40 indicating the number of tetrafluoroethylene units ($CF_2CF_2$) connected to one another end-to-end in an open chain. The known telomers of tetrafluoroethylene include for example the following:

Telogen: Telomer
Aliphatic alcohols such as
  methanol _____ $H(CF_2CF_2)_nCH_2OH$
Hydrocarbons such as
  butane _____ $H(CF_2CF_2)_nC_4H_9$
Chlorinated compounds,
  e.g., carbon tetrachloride _____ $Cl(CF_2CF_2)_nCCl_3$
Fluorinated compounds
  e.g. $CF_3I$ _____ $CF_3(CF_2CF_2)_nI$ Many of the telogens that have been used in the past to produce tetrafluoroethylene telomers introduce non-fluorinated end groups into the telomer. Thus for example, methanol introduces a hydrogen atom a one end of the molecule and a $CH_2OH$ group at the other. The terminal hydrogen atom, which is difficult to replace, renders these telomers and their derivatives much less desirable for many applications. Thus for example, the omega-hydro perfluorinated carboxylic acids that may be obtained from such telomers by oxidation of the terminal —$CH_2OH$ group have surface active properties which are considerably inferior to those exhibited by a corresponding perfluorinated acid.

Likewise, polychlorinated telogens such as carbon tetrachloride which introduce a plurality of chlorine atoms into the telomer are often undesirable because of the effect of the chlorinated groups on the thermal and chemical stability, oil solubility properties and the like of the telomer.

A class of telogens which has been suggested which is capable of providing a perfluorinated group at one end of the telomer is the normal perfluoroalkyl iodides such as $CF_3I$, $CF_3CF_2I$ or $CF_3CF_2CF_2I$. The telomers obtained such as $CF_3(CF_2CF_2)_nI$ are completely perfluorinated with the exception of the terminal iodine atom. The terminal iodine provides a functional group through which the telomer may be converted to derivatives such as perfluorocarboxylic acids, e.g. by the reaction of the perfluoroalkyl iodide with chlorosulfonic acid followed by hydrolysis of the chlorosulfate thus formed (see copending application of Hauptschein et al. Serial No. 735,702, filed May 16, 1958 for a detailed description of such reactions).

Although such n-perfluoroalkyl iodide telogens are capable of providing telomers convertible into the desired perfluorinated derivatives, such telomerization reactions have not in the past been considered to be a practical route to such derivatives largely because of the difficulty of controlling the chain lentgh of the telomers produced by this method. Unless a relatively large excess of the perfluorinated telogen iodide is employed, the tendency is to produce a wide spectrum of telomers having chain lengths containing e.g. up to 20 tetrafluoroethylene units and more, mostly solid telomers in the higher molecular weight range, rather than a telomer product of a relatively narrow range of telomer chain lengths. The use of a large excess of telogen is undesirable because of the large amount of relatively expensive telogen that must be handled and recovered in order to produce a small amount of telomer product. Furthermore, the use of excess telogen in order to prevent the production of a wide spectrum of higher molecular weight telomers tends to produce excessive quantities of the 1:1 adduct (containing only one tetrafluoroethylene unit) as an unwanted by-product. See for example, R. N. Haszeldine, Journal Chemical Society, (London) 1949, pages 2856 to 2861 and R. N. Haszeldine, Journal Chemical Society, (London) December, 1953, pages 3761 to 3768 where telomerizations of tetrafluoroethylene using $CF_3I$ and $C_2F_5I$, $CF_3CF_2CF_2I$ etc. telogens are described.

A telomerization procedure which produces a telomer product of a wide range of chain lengths is, of course, impracticable where derivatives of a relatively narrow range of molecular weights, e.g. perfluorinated carboxylic acids having from 6 to 12 carbon atoms, are desired. In such a case, not only are tedious and expensive separation procedures involved in order to recover the desired molecular weight cut, but also, large quantities of expensive by-product must be discarded.

There is accordingly a need for a procedure for the telomerization of tetrafluoroethylene which will produce a perfluoro or essentially perfluoro terminal group at one end of the molecule, and a functional group at the other end through which the telomer may be converted to desired derivatives, and which at the same time is capable of producing telomers in desired relatively narrow molecular weight ranges.

In accordance with the present invention, a telomerization procedure which fulfills this need has been found. It has been discovered that if a secondary perfluorinated or monochloroperfluorinated alkyl iodide is employed rather than the normal perfluoroalkyl iodides which have been used in the past, the degree of control that may be exercised over the molecular weight of the telomer product is markedly improved. With the use of a secondary iodide, it is not necessary to use a large excess of telogen in order to avoid the production of a large amount of relatively high molecular weight products of widely varying telomer chain length; good yield of telomers containing e.g. from 2 to 5 tetrafluoroethylene units may be obtained with substantially equimolar ratios of telogen:olefin. Thus, the two fold advantage of avoiding a large excess of telogen and of obtaining a product of relatively narrow molecular weight range is achieved. Furthermore, with the use of a secondary rather than a normal fluorinated iodide, it has been found that the molecular weight distribution of the telomer products may be shifted to higher or lower values in relatively narrow bands by altering such factors as the telogen:olefin ratio in a batch operation, or the tetrafluoroethylene pressure in a continuous operation.

The secondary iodide telogens useful in the present invention are those having the formula:

where $R^1$ and $R^2$ may be perfluoroalkyl or perfluoromonochloroalkyl radicals and may be the same or different.

As used herein, a perfluoroalkyl radical means one containing only carbon and fluorine, while a perfluoromonochloroalkyl radical means one containing only carbon, fluorine and one chlorine atom. $R^1$ will generally contain from 1 to 6 carbon atoms while $R^2$ will generally contain from 1 to 20 carbon atoms. Preferably, $R^1$ is a $CF_3$— radical and $R^2$ is preferably a perfluoroalkyl or a perfluoromonochloroalkyl radical having from 1 to 6 carbon atoms.

Examples of specific secondary telogen iodides that may be employed are:

I. 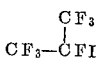

II. 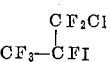

III. 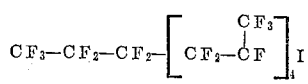

IV. 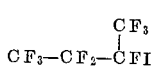

V. 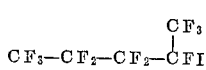

VI. 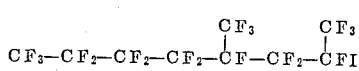

VII. 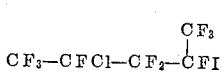

VIII. 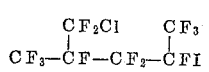

IX. 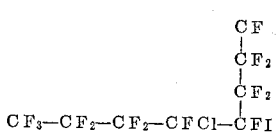

X. 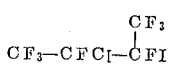

XI. 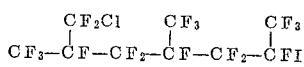

The iodides

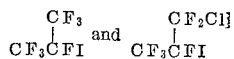

are particularly preferred. These may be readily prepared by the addition of IF and ICl respectively to perfluoropropene. Second iodides such as

and

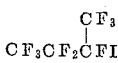

may be prepared by telomerization of perfluoropropene with alkyl iodides such as $C_3F_7I$ and $CF_3I$ as described in copending application Serial No. 701,995 of Murray Hauptschein et al., filed December 11, 1957.

To carry out the telomerization reaction the secondary iodide telogen and tetrafluoroethylene are heated under super-atmospheric pressures and in the absence of a catalyst at temperatures ranging from 150 to 220° C. and preferably from 160 to 190° C. Reaction temperature is important from a number of standpoints. It is important first of all from the standpoint of the control that may be exercised over the telomer chain length. At temperatures above 220° C. it becomes difficult to avoid the production of a telomer product of widely varying molecular weight tending largely to telomers of high molecular weight.

Optimum control over molecular weight is generally obtained in the preferred range of 160 to 190° C. Reaction temperature is important also from the standpoint of avoiding the production of unwanted by-products such as tetrafluoroethylene dimers (e.g. cyclic $C_4F_8$), and coupling products produced by thermal rupture of the telomer carbon-iodine bond and coupling of the telomer radicals thus produced. In this regard, the ability of the secondary alkyl iodides to react at lower temperatures than the normal perfluoroalkyl idodides previously suggested is a further advantage since the losses due to such side reactions are thereby minimized.

Super-atmospheric pressures of at least 50 lbs./in.² and preferably at least 100 lbs./in.² gage are required. There is no upper limit of pressure except that set by practical considerations. Thus, pressures of 20,000 lbs./in.² and higher may be employed. Preferred reaction pressures are in the range of 100 to 5,000 lbs./in.².

Reaction time is not critical and may vary over wide limits ranging from a few minutes to several days depending upon the degree of conversion desired. Ordinarily, reaction periods of from 1 to 10 hours will be used.

The reaction is carried out in the absence of catalysts. The use of heat rather than catalytic means for initiating the polymerization reaction is advantageous not only by virtue of the fact that closer control is thereby obtained over the molecular weight (when the reaction temperatures are within the ranges above stated) but also because a purer product is obtained free from the fragments that are often introduced into the telomer by the catalyst. For example, when an organic peroxide such as benzoyl peroxide is employed in a catalytic telomerization reaction, often fragments of the catalyst, such as phenyl groups are found in the telomer product. In an otherwise perfluorinated product, such impurities have a substantial deleterious effect upon desired properties such as surface activity and dielectric properties.

The telomerization reaction may be carried out in various ways. In a sealed autoclave reaction, for example, the telogen iodide and tetrafluoroethylene are introduced into an autoclave which is then sealed and heated preferably with stirring, shaking or other types of agitation, until the pressure drop indicates that the reaction has proceeded to the desired extent. In such an operation, the molar ratio of olefin to telogen is important in determining the molecular weight of the telomer products. The higher the olefin:telogen ratio in general, the higher will be the average molecular weight of the product. Olefin:telogen molar ratios ranging from 1:2 to 10:1 and preferably from about 1:1 to 5:1 will be used to produce relatively low molecular weight telomers, i.e. telomers containing up to 20 tetrafluoroethylene units per telomer molecule. As pointed out previously, at any given reactant ratio, a narrower band of telomer chain lengths is obtained when a secondary rather than a primary prefluoroalkyl iodide is employed.

In a constant pressure reaction, i.e. where a constant pressure of tetrafluoroethylene is maintained above the liquid telogen iodide phase during the reaction, the molecular weight of the product may be controlled by varying the tetrafluoroethylene pressure. In general, the higher the tetrafluoroethylene pressure over the telogen, the higher the molecular weight of the product and conversely.

Although the invention does not depend upon any particular theory of the mechanism of the reaction, it is believed that the reaction proceeds in the following manner (as illustrated by the reaction of

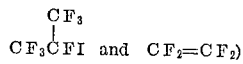

and (1) 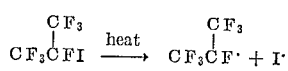

(2) $$CF_3CF\cdot + nCF_2=CF_2 \longrightarrow CF_3CF(CF_2CF_2)_n\cdot$$
       |                                |
       CF$_3$                          CF$_3$ (3) $$CF_3CF(CF_2CF_2)_n\cdot + CF_3CFI \longrightarrow$$
     |                        |
     CF$_3$                   CF$_3$ $$CF_3CF(CF_2CF_2)_nI + CF_3CF\cdot$$
 |                      |
 CF$_3$                 CF$_3$ In accordance with the above mechanism, upon heating the reaction mixture, a free radical is formed by the rupture of the carbon to iodine bond of the telogen iodide (Equation 1). The free radical thus formed then reacts almost instantaneously with successive molecules of tetrafluoroethylene to build up a telomer radical (Equation 2). The growing telomer radical is terminated by reacting with another molecule of the telogen iodide, (i.e. chain transfer with the iodide) releasing in the process another free radical capable of reacting with further olefin (Equation 3). The improved control over the molecular weight of the telomers which is made possible by the use of a secondary iodide is believed attributable to the difference in the reactivity of iodine atom of the secondary iodide telogen on the one hand and of the telomer product on the other. That is to say, it is believed that reactions 1 and 3 take place more readily than the following reactions:

(4) $$CF_3CF(CF_2CF_2)_nI \xrightarrow{heat} CF_3CF(CF_2CF_2)_n\cdot + I\cdot$$
     |                                      |
     CF$_3$                                 CF$_3$ (5) $$CF_3CF(CF_2CF_2)_n\cdot + CF_3CF(CF_2CF_2)_mI \longrightarrow$$
     |                        |
     CF$_3$                   CF$_3$ $$CF_3CF(CF_2CF_2)_nI + CF_3CF(CF_2CF_2)_m\cdot$$
 |                      |
 CF$_3$                 CF$_3$ As can be seen, reactions 4 and 5 both involve the rupture of a carbon to iodine bond in the primary —CF$_2$I group whereas in Equations 1 and 3 the rupture of the carbon to iodine bond in a secondary $$-\underset{\underset{CF_3}{|}}{C}FI$$

group is always involved. It is believed that the carbon to iodine bond in the secondary iodide ruptures more easily and that this favors reactions 1 and 3 over reactions 4 and 5. Suppression of reactions 4 and 5 leads to better control over telomer chain length since once the telomers have been formed, presumably by the procedure of Equations 1 to 3, they do not further react appreciably and thus do not end to undergo progressive increase in molecular weight in a random fashion leading to a wide spectrum of telomer chain lengths in the product. In contrast, a primary perfluoroalkyl iodide telogen, containing as it does the same primary end group —CF$_2$I as does the telomer product, will react no more readily than the telomer product and consequently reaction of the already formed telomers will occur to a greater extent with resulting increased spread in telomer chain lengths.

The following examples are intended to illustrate the invention:

*Example 1.—The Thermal Reaction of* $CF_3\underset{\underset{CF_2Cl}{|}}{C}FI$ *with tetrafluoroethylene*

The secondary iodide $$CF_3\underset{\underset{CF_2Cl}{|}}{C}FI$$

was prepared by the addition of iodine monochloride to perfluoropropene at a temperature of 50° C. and at autogenous pressure.

A 300 milliliter Monel autoclave is charged under a dry nitrogen atmosphere with 221 grams (0.709 mole) of $$CF_3\underset{\underset{CF_2Cl}{|}}{C}FI$$

prepared as described above. The reactor is then cooled first in Dry Ice and then in liquid nitrogen and evacuated after which 88 grams (0.88 mole) of tetrafluoroethylene is admitted to the autoclave by gaseous transfer in vacuo $$CF_3\underset{\underset{CF_2Cl}{|}}{C}FI$$

(molar ratio of $CF_2=CF_2:CF_3CFI$ of 1.24:1)

The autoclave is sealed and heated while shaking for 5 hours at 165 to 170° C. during which time the pressure drops from 1100 to 300 lbs./in.$^2$ (about 90% of the pressure drop occurring in the first one and one-half hours). The autoclave is then allowed to cool. Unreacted olefin is recovered by condensation in liquid nitrogen cooled traps and the remaining products are distilled in Vigreux distillation units to effect separation of individual telomer fractions. Throughout these procedures, precautions are taken to exclude oxygen.

From this reaction there is recovered about 10 grams of unreacted $CF_2=CF_2$, about 5 grams of perfluorocyclobutane, 107 grams of unreacted $$CF_3\underset{\underset{CF_2Cl}{|}}{C}FI$$

and 175 grams of mostly liquid telomer iodides of the formula $$CF_3\underset{\underset{CF_2Cl}{|}}{C}F(CF_2CF_2)_nI$$

where the value of $n$ ranges from one to about seven. Distillation of this telomer product resulted in the separation of the following fractions:

(a) 18 percent by weight of a fraction consisting essentially of $$CF_3\underset{\underset{CF_2Cl}{|}}{C}FCF_2CF_2I$$

having a boiling point of about 45° C. at 40 mm. Hg, and a refractive index $n_D^{30}$ 1.3638.

*Analysis.*—Calculated for C$_5$ClF$_{10}$I: C, 14.56; Cl, 8.60; I, 30.77. Found: C, 14.81; Cl, 8.47; I, 31.04.

(b) 24 percent by weight of a fraction consisting essentially of $$CF_3\underset{\underset{CF_2Cl}{|}}{C}F(CF_2CF_2)_2I$$

having a boiling point of 78° C. at 36 mm. Hg, a refractive index $n_D^{28}$ 1.3552.

*Analysis.*—Calculated for C$_7$ClF$_{14}$I: C, 16.41; Cl, 6.92; I, 24.77. Found: C, 16.60; Cl, 6.95; I, 25.21.

(c) 35 percent by weight of a fraction consisting essentially of $$CF_3\underset{\underset{CF_2Cl}{|}}{C}F(CF_2CF_2)_3I$$

having a boiling point of 106° C. at 34 mm. Hg and a refractive index $n_D^{28}$ 1.3492.

*Analysis.*—Calculated for C$_9$ClF$_{18}$I: C, 17.65; Cl, 5.79; I, 20.72. Found: C, 17.71; Cl, 5.74; I, 21.05.

(d) 12 percent by weight of a fraction consisting essentially of $$CF_3\underset{\underset{CF_2Cl}{|}}{C}F(CF_2CF_2)_4I$$

having a boiling point of about 130° C. at 30 mm. Hg.

*Analysis.*—Calculated for C$_{11}$ClF$_{22}$I: C, 18.54; I, 17.81. Found: C, 18.64; I, 18.06.

(e) 11 percent by weight of a fraction consisting of telomer iodides of the formula $$CF_3\underset{\underset{CF_2Cl}{|}}{C}F(CF_2CF_2)_nI$$

where the value of $n$ is greater than 4 and mostly in the range of 5 to 6. This fraction is partly solid at room temperature.

As is apparent from the above, 71% of the telomer product consisted of telomers containing from 2 to 4 tetrafluoroethylene units while only 11% consisted of telomers containing more than four tetrafluoroethylene units, this latter fraction consisting mostly of telomers containing 5 and 6 units. The telomers of fractions (b), (c) and (d) containing from 7 to 11 carbon atoms are of excellent utility for conversion to essentially perfluorinated carboxylic acids having superior surface active properties. The conversion of the telomer iodide to carboxylic acids may be readily accomplished by reaction with chlorosulfonic acid or fluosulfonic acid according to the procedures described in detail in copending application Serial No. 735,702, filed May 16, 1958 of Murray Hauptschein et al. For example, the telomer iodide of the formula $$CF_3CF(CF_2CF_2)_3I \quad \text{with} \quad CF_2Cl$$

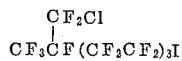

may be converted into the corresponding acid

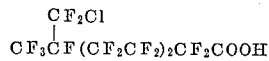

surprisingly, despite the terminal chlorine atom, such acids have been found to have surface active properties which are superior in some respects to those displayed by similar perfluorinated carboxylic acids. Such terminally branched chain perfluoromonochlorocarboxylic acids and derivatives are described and claimed in copending application Serial No. 124,257, filed June 2, 1961 of Murray Hauptschein et al.

*Example 2.—The Thermal Reaction of*  $CF_3CFI$ *with Tetrafluoroethylene*

The secondary perfluoro iodide

was prepared in the manner described in copending application Serial No. 810,211 of Murray Hauptschein et al. by reaction of perfluoropropene with a mixture of iodine and iodine pentafluoride (in the ratio $2I_2:IF_5$) in the presence of metallic aluminum and aluminum iodide as a catalyst at a super-atmospheric pressure and at temperatures from 140 to 150° C.

A 300 milliliter Monel autoclave is charged under a dry nitrogen atmosphere with 207 grams (0.7 moles) of

prepared as described above. The autoclave is then cooled in liquid nitrogen and evacuated and 87.5 grams (0.875 mole) of tetrafluoroethylene is admitted to the autoclave by gaseous transfer in vacuo (molar ratio of

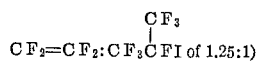 of 1.25:1)

The autoclave is sealed and heated while shaking at a temperature of 165 to 172° C. for 5½ hours. The pressure drops during this period from 1100 to 250 lbs./in.², most of the drop occurring during the first hour.

After cooling the autoclave there is recovered 15 grams of tetrafluoroethylene, 8 grams of the cyclic dimer $C_4F_8$, 106 grams of unreacted

and 160 grams of liquid and solid telomer iodides of the formula

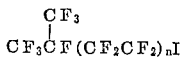

in which the value of $n$ ranges from 1 to about 8. Upon distillation of these telomers in a small Vigreux distillation unit the following individual telomer fractions were separated:

(a) 22 weight percent of a fraction consisting essentially of

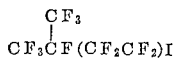

having a boiling point of about 94° C. at 760 mm. Hg and a refractive index $n_D^{26}$ 1.3337.

*Analysis.*—Calculated for $C_5F_{11}I$: C, 15.17; I, 32.05. Found: C, 15.15; I, 32.50.

(b) 23 weight percent of a fraction consisting essentially of

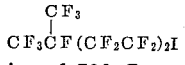

having a boiling point of 70° C. at 70 mm. Hg and a refractive index $n_D^{30}$ 1.3298.

*Analysis.*—Calculated for $C_7F_{15}I$: C, 16.95; F, 57.44; I, 25.59. Found: C, 17.10; F, 58.09; I, 26.09.

(c) 15 weight percent of a fraction consisting essentially of

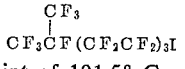

having a boiling point of 101.5° C. at 70 mm. Hg, and a refractive index $n_D^{30}$ 1.3290.

*Analysis.*—Calculated for $C_9F_{19}I$: C, 18.14; I, 21.29. Found: C, 18.01; I, 21.13.

(d) 10 weight percent of a fraction consisting essentially of

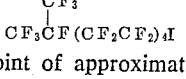

having a boiling point of approximately 125° C. at 70 mm. Hg.

(e) 30 weight percent of a fraction solid at room temperature consisting of telomers of the formula

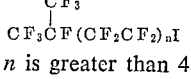

where the value of $n$ is greater than 4 and mostly in the range of from 5 to 7.

As may be seen, 48 percent of the telomer product contained from 2 to 4 tetrafluoroethylene units and the entire product lies in the relatively narrow range of from 1 to 7 tetrafluoroethylene units. The telomers having 2 to 4 tetrafluoroethylene units per molecule (ranging from $C_7$ to $C_{11}$) are particularly valuable for the preparation of perfluorinated carboxylic acids and derivatives of outstanding properties. For example, the telomer iodides may be converted into carboxylic acids as explained above by reaction with chlorosulfonic acid. Thus the telomer iodide

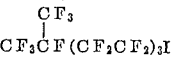

may be converted into the perfluorinated carboxylic acid

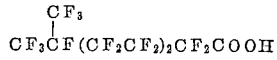

Such terminally branched chain perfluorinated acids and derivatives have outstanding surface active properties.

*Example 3.—Thermal Reaction of* $CF_3CF_2CF_2[CF_2$$CF]_4I$ *With Tetrafluoroethylene*

This example illustrates the production of higher molecular weight telomers by the use of high olefin:iodide molar ratios. The telomer iodide

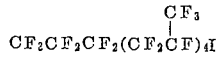

is prepared by the reaction of $CF_3CF_2CF_2I$ with perfluoropropene in the manner described in copending U.S. application Serial No. 701,995, filed December 11, 1957 by Murray Hauptschine et al., now Patent No. 3,083,238.

A Monel metal autoclave of approximately 140 cc. volume is charged with 40 grams (0.446 mole) of the above perfluoroiodide after which the autoclave is sealed, evacuated and cooled to −195° C. Forty grams (0.40 mole) of tetrafluoroethylene is admitted to the autoclave by gaseous transfer in vacuo (molar ratio of olefin:iodide of 9:1). The autoclave is heated while shaking for 18 hours at a temperature of 190° C. during which the pressure drops from an initial pressure of 1400 lbs./in.² to below 50 lbs./in.²

From this reaction there is recovered 1 gram of tetrafluoroethylene and 8 grams of

and 70 grams (75% conversion) of a white soft solid consisting of telomer iodides of the formula

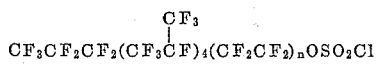

where the value of $n$ has an average value of 12.

By conversion of the iodide to the chlorosulfate $$CF_3CF_2CF_2(CF_3\overset{\overset{CF_3}{|}}{C}F)_4(CF_2CF_2)_nOSO_2Cl$$

(through reaction with chlorosulfonic acid as described in copending application Serial No. 735,702), followed by fractional distillation of the chlorosulfate and analysis of the chlorosulfate fractions, it is determined that the telomer product consists of a mixture of telomers containing from 9 to 25 olefin units per molecule and that approximately 75% of the product consists of telomers containing from 9 to 13 olefin units. The relatively narrow range of molecular weights obtained at an olefin:telogen ratio of 9:1 again illustrates the greatly improved control over telomer chain length made possible by the use of a secondary iodide telogen.

The telomers prepared in accordance with the invention may be represented by the general formula:

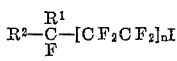

where $R^1$ and $R^2$ are perfluoroalkyl or perfluoromonochloroalkyl radicals preferably having respectively from 1 to 6 and from 1 to 20 carbon atoms, and where $n$ is an integer which preferably has a value ranging from 1 up to about 40. It has been found that these tetrafluoroethylene telomers have particularly desirable properties which result apparently from the branching in the carbon chain introduced into the telomer by the secondary telogen iodide. Thus, branched chain perfluoromonochloroalkyl carboxylic acids and derivatives thereof prepared from telomer iodides of the invention have been found to have properties superior in many respects to similar straight chain carboxylic acids and derivatives as more fully described in copending application Serial No. 124,257.

Particularly valuable among the branched chain tetrafluoroethylene telomer iodides of the invention are those in which the branching occurs at the end of the telomer molecule, i.e. telomers in which $R^1$ is a $CF_3$— radical and in which $R^2$ is either a $CF_3$— or a $CF_2Cl$— radical. Such terminally branched chain telomer iodides may be readily converted into a variety of derivatives through the reactions of the terminal iodine atom, such as reaction with chlorosulfonic or fluorosulfonic acid as previously explained. Of particular value are telomers of the formula

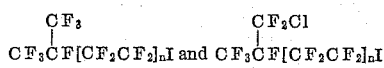

where the value of $n$ ranges from 2 to 6, readily convertible into corresponding acids, amides, esters etc. having from 7 to 15 carbon atoms.

We claim:

1. A method for preparing telomers of tetrafluoroethylene which comprises reacting tetrafluoroethylene with a secondary iodide of the formula

where $R^1$ and $R^2$ are selected from the class consisting of perfluoroalkyl and perfluoromonochloroalkyl radicals at a temperature of from 150° C. to 220° C. and under super-atmospheric pressure of at least 100 lbs./in.² gage.

2. A method in accordance with claim 1 in which the reaction temperature is from 160° to 190° C.

3. A method in accordance with claim 1 in which $R^1$ contains from 1 to 6 carbon atoms and $R^2$ contains from 1 to 20 carbon atoms.

4. A method in accordance with claim 1 in which $R^1$ is a $CF_3$—radical and $R^2$ is selected from the class consisting of perfluoroalkyl and perfluoromonochloroalkyl radicals having from 1 to 6 carbon atoms.

5. A method in accordance with claim 1 in which said secondary iodide is

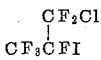

6. A method in accordance with claim 1 in which said secondary iodide is

7. A method for preparing telomers of tetrafluoroethylene which comprises reacting tetrafluoroethylene with a secondary iodide of the formula

where $R^1$ and $R^2$ are selected from the class consisting of perfluoroalkyl and perfluoromonochloroalkyl radicals, and where $R^1$ contains from 1 to 6 carbon atoms and $R^2$ from 1 to 20 carbon atoms; said reaction being carried out at a temperature of from 150° to 220° C. and under super-atmospheric pressure of at least 100 lbs./in.² gage in the absence of a catalyst.

8. A method in accordance with claim 7 in which the reaction temperature is from 160° to 190° C. and in which the reaction pressure is from 100 to 5000 lbs./in.² gage.

9. A method in accordance with claim 8 in which $R^1$ is a $CF_3$—radical and $R^2$ is selected from the class consisting of perfluoroalkyl and perfluoromonochloroalkyl radicals having from 1 to 6 carbon atoms.

10. A method in accordance with claim 8 in which said secondary iodide is

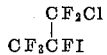

11. A method in accordance with claim 8 in which said secondary iodide is

References Cited in the file of this patent

FOREIGN PATENTS 774,103     Great Britain _____ May 8, 1957

OTHER REFERENCES

Haszeldine: Jour. Chem. Soc. (London), December 1953, pp. 3761–8.

Hauptschein et al.: Jour. Am. Chem. Soc., vol. 79 (May 1957), pp. 2549–53.

UNITED STATES PATENT OFFICE
CERTIFICATE OF CORRECTION

Patent No. 3,156,732            November 10, 1964

Murray Hauptschein et al.

It is hereby certified that error appears in the above numbered patent requiring correction and that the said Letters Patent should read as corrected below.

Column 1, line 37, for "a", second occurrence, read -- at --; column 2, line 1, for "lentgh" read -- length --; column 3, lines 35 to 40, No. IX, the secondary telogen iodide should appear as shown below instead of as in the patent:

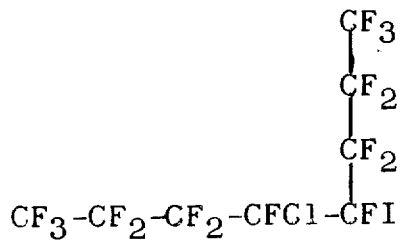

column 3, line 48 to 50, for the upper right-hand portion of the iodides reading:

$CF_2Cl]$          read          $CF_2Cl$ line 53, for "Second" read -- Secondary --; column 4, line 10, for "idodides" read -- iodides --; line 55, for "prefluoroalkyl" read -- perfluoroalkyl --; column 5, line 49, for "end" read -- tend --; column 9, line 1, for "(0.446 mole)" read -- (0.0446 mole) --.

Signed and sealed this 30th day of March 1965.

(SEAL)
Attest:

ERNEST W. SWIDER            EDWARD J. BRENNER
Attesting Officer            Commissioner of Patents